United States Patent [19]

Coope

[11] Patent Number: 4,596,926
[45] Date of Patent: Jun. 24, 1986

[54] FORMATION DENSITY LOGGING USING MULTIPLE DETECTORS AND SOURCES

[75] Inventor: Daniel F. Coope, Houston, Tex.

[73] Assignee: NL Industries, Inc., New York, N.Y.

[21] Appl. No.: 474,367

[22] Filed: Mar. 11, 1983

[51] Int. Cl.$^4$ .............................................. G01V 5/00
[52] U.S. Cl. ..................................... 250/265; 250/266
[58] Field of Search ............... 250/265, 264, 266, 256, 250/269, 254

[56] References Cited

U.S. PATENT DOCUMENTS

| | | | |
|---|---|---|---|
| 3,032,658 | 5/1962 | Youmans | 250/265 |
| 3,038,075 | 6/1962 | Youmans | 250/266 |
| 3,389,257 | 6/1968 | Caldwell et al. | 250/256 |
| 3,617,746 | 11/1972 | Janssen | 250/265 |
| 3,846,631 | 11/1974 | Kehler | 250/269 |
| 4,048,495 | 9/1977 | Ellis | 250/269 |
| 4,297,575 | 10/1981 | Smith, Jr. et al. | 250/266 |

Primary Examiner—Alfred E. Smith
Assistant Examiner—Richard Hanig
Attorney, Agent, or Firm—Carl O. McClenny; William E. Johnson, Jr.

[57] ABSTRACT

A gamma ray density sub and method useful for measurement-while-drilling applications utilizing three pairs of gamma ray sources and detectors located symmetrically about the axis of the sub and computation of the product of the counting rates obtained from the three detectors to indicate the average density of a formation sample surrounding a borehole traversing an earth formation. The sub is able to measure the density of the sample, independent of the location of the sub within the borehole and the chemical composition of the interfering materials lying between the formation sample and the detectors.

15 Claims, 2 Drawing Figures

FORMATION DENSITY LOGGING USING MULTIPLE DETECTORS AND SOURCES

BACKGROUND OF THE INVENTION

2. Field of the Invention

The present invention relates to logging of a subterranean formation for determination of density using gamma rays. Particularly, this invention relates to determination of formation density without positioning the logging probe against the wall of the borehole traversing the earth formation. More particularly, this invention is useful for measurement of density while drilling.

2. Setting of the Invention

Wireline gamma ray density probes are devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

The major difficulties encountered in conventional gamma ray density measurements include definition of the sample size, limited effective depth and sampling, disturbing effects of undesired, interfering materials located between the density probe and the sample and the requirement that the probe be positioned against the borehole wall. The chemical composition of the sample also affects the reading of conventional gamma ray density probes.

One prior art wireline density probe disclosed in U.S. Pat. No. 3,202,822 incorporates two gamma ray detectors, one collimated gamma ray source and ratio building electronic circuits, and is useful as long as the interfering materials, located between the detectors of the probe and the formation sample, are identical in thickness and chemical composition along the trajectories of emitted and received gamma rays. Non-uniformities in the wall of the borehole will interfere with the proper operation of the probe. Such non-uniformities can be caused by crooked holes, by cave-ins, and by varying thicknesses of the mudcake on the wall of the hole.

The prior art also includes U.S. Pat. No. 3,846,631 which discloses a wireline density probe which functions regardless of the thickness and the chemical composition of materials that are located between the density probe and the sample. The method comprises passing of two gamma ray beams from two intermittently operated gamma ray sources into the sample, receiving the radiation backscattered from each of the two sources by two separate detectors, and building ratios of products of the four separate counting rates in such a manner that the numerical result is an indication of the density of the sample.

The critical dimension of the two-detector probe is the spacing between the detectors. If the interfering materials are non-uniform over distances comparable to the spacing of the two detectors, the measured density will be erroneous.

Neither of the wireline probes described above is disclosed as being useful for measurement while drilling and incorporation into a rotating drill string.

SUMMARY OF THE INVENTION

It is primary object of this invention to provide a method and apparatus for measuring the density of a subterranean formation while drilling a borehole traversing the formation.

This object and other objects are realized and the limitations of the prior art are overcome in the apparatus of the invention which includes a device for use in a borehole traversing an earth formation including a gamma ray emitting means, the means emitting collimated gamma ray beams along at least three trajectories, the trajectories projecting in an azimuthally symmetric pattern about an axis of the device, intersecting at a first point on the axis of the device, and intersecting a first circle located in a sample of the formation to be measured, a first gamma ray detecting means oriented to receive emitted gamma rays scattered from at least three locations within the formation sample along a first at least three trajectories, the trajectories projecting in an azimuthally symmetric pattern about the axis of the device, intersecting a second point on the axis of the device and intersecting the first circle, and a means for determining the product of the counting rate of gamma rays received by the detecting means from each of the at least three trajectories as scattered from the at least three locations within the formation sample, wherein, the product is indicative of the average density of the formation sample.

The objects of this invention are realized further by the method of determining the average density of a sample of earth formation surrounding a borehole including the steps of lowering a device into the borehole to a location adjacent to the sample; emitting gamma rays into the formation from the device along at least three trajectories projecting in an azimuthally symmetric pattern about the axis of the device, intersecting at a first point on the axis of the device and intersecting a first circle located in the formation sample, counting the emitted gamma rays scattered from the formation sample back to the device along a first set of at least three trajectories projecting in an azimuthally symmetric pattern about the axis of the device, intersecting at a second point on the axis of the device and intersecting the first circle, and determining the product of the at least three count measurements, wherein the product is indicative of the average density of the formation sample.

BRIEF DESCRIPTION OF THE DRAWINGS

Other features and intended advantages of the invention will be more readily apparent by reference to the following detailed description in connection with the accompanying drawings in which.

While the invention will be described in connection with a presently preferred embodiment, it will be understood that it is not intended to limit the invention to this embodiment. On the contrary, it is intended to cover all alternatives, modifications and equivalents as may be included within the spirit of the invention as defined in the appended claims.

PREFERRED EMBODIMENT OF THE INVENTION

Figure 1:
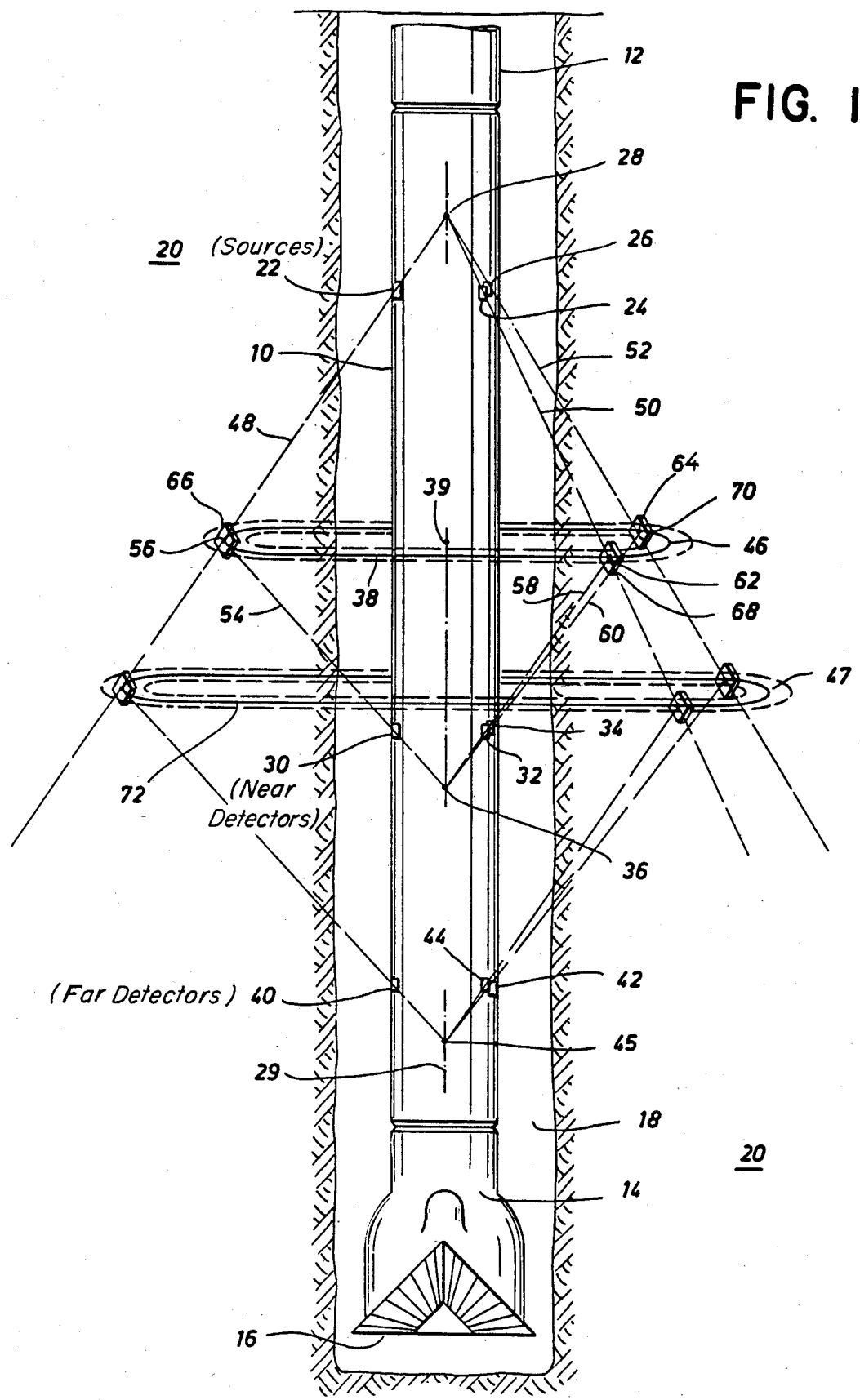
FIG. 1 is a cross-sectional representation of a device in accordance with the present invention for logging densities in a formation traversed by a rotating drill string.

The gamma density sub 10 of this invention is shown in FIG. 1 as interconnected between the upper drill string 12 and the lower drill strink 14 which rotate causing the drill bit 16 to form borehole 18 traversing earth formation 20.

The sub 10 includes a first gamma ray source 22, a second gamma ray source 24, and a third gamma ray source 26. The three sources are situated about the sub 10 in an azimuthally symmetric pattern. More sources may be utilized provided they are in azimuthally symmetrically orientation about the sub 10. The sources are collimated to form trajectories which are also azimuthally symmetrical. The trajectories are oriented to pass through a first point 28 located on the axis 29 of the sub 10. The term trajectory as used herein indicates not only the actual path of travel of the gamma ray but also a line of extention behind the source as well as beyond the detector.

The plurality of sources may be a single primary source from which the emitted gamma rays are collimated to form the at least three symmetrical gamma ray beams.

The sub 10 further includes a first set of detectors including a first gamma ray detector 30, a second gamma ray detector 32, and a third gamma ray detector 34. The detectors are situated about the sub 10 in an azimuthally symmetrical pattern which is in axial and azimuthal alignment with the first, second and third sources 22, 24 and 26. If more sources are utilized, an equivalent number of detectors will also be used. The detectors are collimated to receive gamma rays scattered from the formation along trajectories which are also azimuthally symmetrical. The trajectories are oriented to intersect the axis 29 of the sub 10 at a second point 36.

The trajectories from the sources will intersect the first set of detector trajectories at a first circle 38 about the sub 10. The first circle falls in a plane which is perpendicular to the axis of the sub 10, the plane intersecting the axis 29 at a third point 39. The second point is positioned an axial distance away from the first point and the first and second points are preferably on opposite sides of the third point 39.

The sub 10 includes a second set of detectors including a fourth gamma ray detector 40, a fifth gamma ray detector 42 and a sixth gamma ray detector 44. This second set of detectors is situated about the sub 10 in an azimuthally symmetrical pattern which is also in axial and azimuthal alignment with the first, second and third sources, 22, 24 and 26 and the first set of detectors 30, 32 and 34.

The second set of detectors will receive gamma rays along a third set of at least three trajectories which are azimuthally symmetric about the sub 10 and are oriented to intersect the axis 29 at a fourth point 45 and to intersect a second circle 72. Preferably, the fourth point 45 and the first point 28 are on opposite sides of the third point 39. Each trajectory of the third set should be parallel to a corresponding trajectory of the second set.

The first and second sets of detectors are shielded from the sources to prevent the emitted gamma rays from reaching the detectors directly.

The first circle 38 and the second circle 72 formed in the formation 20 will be the center of the formation samples 46 and 47 respectively which are to be measured for density.

In the method of this invention the sub 10 rotates about its axis 29 as gamma rays 48 are emitted into the sample by the first source 22, gamma rays 50 by the second source 24 and gamma rays 52 by the third source 26. The emitted collimated beams of gamma rays form a first cone-shaped region of formation which is irradiated.

In the formation 20, some of the gamma rays 48, 50 and 52 are scattered by the sample formation 46 toward the first set of detectors. Gamma rays 54 are scattered at location 56 in formation sample 46 toward and received by the first detector 30. Gamma rays 58 and 60 are scattered at locations 62 and 64 in formation sample 46 towards and received by the second and third detectors 32 and 34 respectively. Since the three collimated sources 22, 24 and 26 are symmetrically located, there is only one right conical region irradiated during the sub's rotation. The three collimated detectors 30, 32 and 34 receive emitted gamma rays scattered from the formation sample 46 back to the sub 10 along trajectories forming a second cone, inverted with respect to the first cone.

Cone thickness is determined by the diameter of the collimators. The circle 38 formed by the intersection of the cones has as its center axis 29 of sub 10. At a given instant of time, three small sectors 66, 68 and 70 of the formation sample, each 120° from the others, will be sampled.

Figure 2:
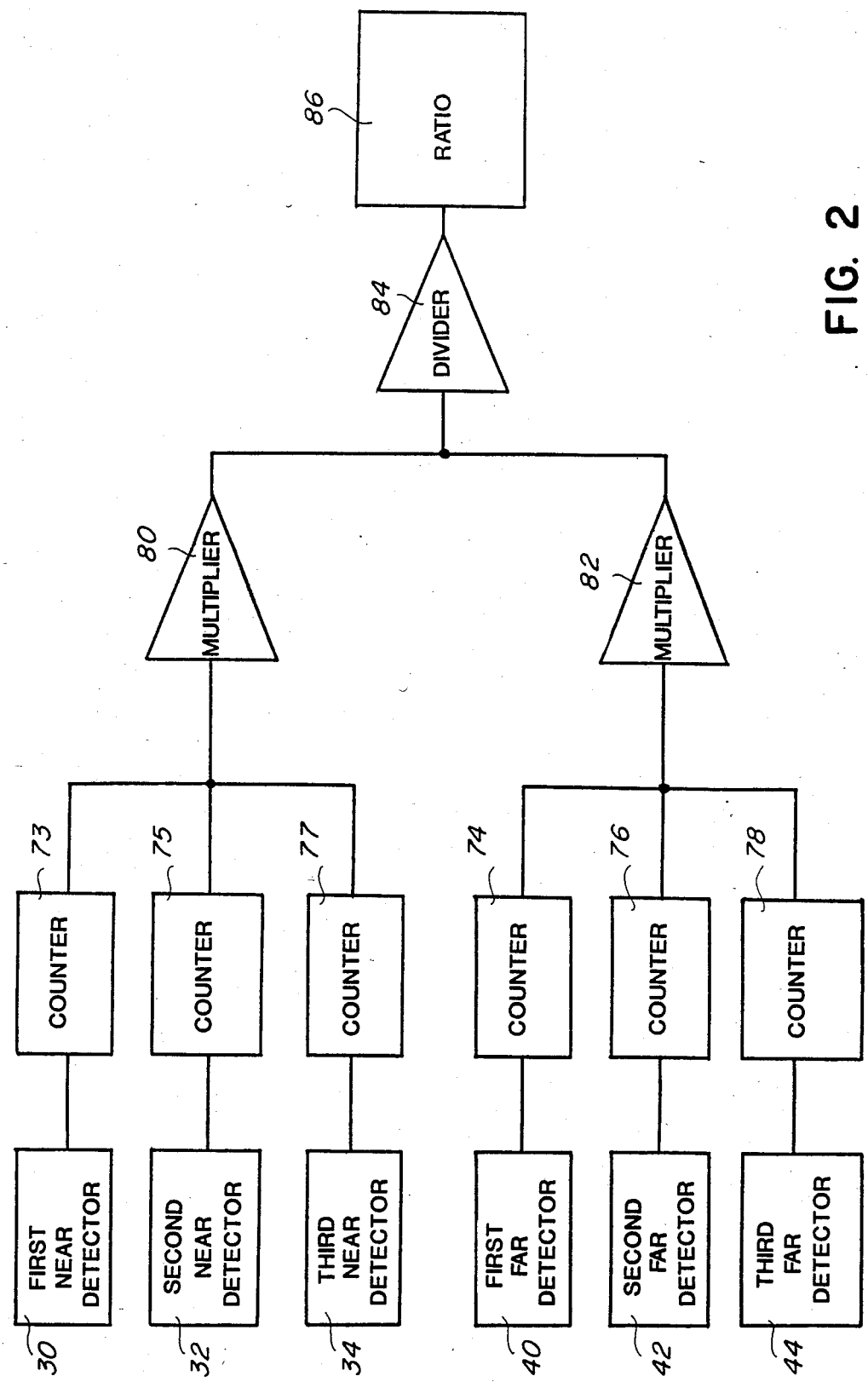
FIG. 2 is a block diagram of the electronic circuitry required to detect and count gamma rays and obtain counting rate products and ratios thereof.

Referring now also to FIG. 2, the received gamma rays 54, 58 and 60 will react with the first set of detectors 30, 32 and 34 and cause electrical pulses. The pulse amplitudes are proportional to the energy of the received gamma rays. If it is desired to provide counting rates indicative of only those rays which have been scattered only once in the same sample 46, these pulses would be amplified by preamplifiers and amplifiers, and fed to discriminators not shown, which are set to pass only those pulses having energy levels of gamma rays that were scattered at the location 56, towards the detector 30, at location 62 towards the detector 32 and at location 64 towards the detector 34. Gamma rays that underwent multiple scattering prior to entering the detectors 30, 32 and 34 will be rejected by the discriminators. The output of the detectors and, if used, the discriminators, leads to the gates, not shown, which provide individual counting rates of received gamma rays from the three detectors 30, 32 and 34.

The individual counts from the first and second sets of detectors may vary with time due to the sub's location within the borehole as caused by rotation of the drill string off the axis of the borehole.

In the method of this invention, the three instantaneous counts from the first set of detectors are multiplied thereby resulting in a constant value thus indicating elimination of variables with time, such as the thickness of mud and casing through which the emitted gamma rays must pass to be received at the detectors, and the movement of the sub 10 in relation to the borehole wall.

The sub 10 in an off axis position, will receive gamma rays 48 that have scattered from the formation sample 46 at detector 30 and which have traveled thru a different amount of mud and formation than gamma rays 50 and 52 from sources 24 and 26 respectively. However, the sum of the path lengths through mud, and the sum of the path lengths through the formation are constant provided that the diameter of sub 10 is substantially similar to the diameter of borehole 18.

A density log for measurement while drilling applications should be accurate to within about 0.1 g/cm$^3$. Since formation density is typically 2.5 g/cm$^3$, the accuracy required is about 4%. If vertical resolution required for the log is 0.5 foot, a required counting rate may be estimated as follows:

$$\sigma/N_1N_2N_3 \leq 0.01$$

where:

$\sigma$ is the statistical variation of the product $N_1N_2N_3$,
$N_1$ is the counting rate at detector 30,
$N_2$ is the counting rate at detector 32, and
$N_3$ is the counting rate at detector 34.
Assuming $N_1 \approx N_2 \approx N_3 \approx N$
then (from the field of statistics)

$$\sigma^2 \cong 3N^5$$

and $$\frac{\sigma}{N_1N_2N_3} \approx \frac{\sigma}{N^3} = \sqrt{\frac{3}{N}} \leq 0.01$$

Solving for N $$\frac{\sqrt{3}}{\sqrt{N}} = 0.01$$

$$N = 3.0 \times 10^4 \text{ counts}$$

Each density log measurement should detect an average of 30,000 counts per measurement and there should be a measurement every ½ foot. At 60 feet per hour drilling rate, each measurement will therefore be completed in 30 seconds.

Therefore, each detector should have sufficient sensitivity such that about 333 counts per second are registered. Alternatively, each source may be adjusted to emit at a rate such that the detectors receive at the required rate of 333 counts per second.

To compensate for borehole effects on the measurement of the average density for the formation samples 46 and 47, the method of this invention would include use of the counts from the second set of detectors 40, 42 and 44. The product of these three counts would be used to form a ratio between the product of the first set of detectors and the product of the second set of detectors. Alternatively, the product of the three ratios of the detector of the first set to a corresponding detector of the second set may be used to determine the average density.

A similar arrangement for the second set of detectors 40, 42 and 44 may be included in the sub 10 for receiving, discriminating, counting, storing and using the gamma rays received by the second set.

The product of the counts in detectors 30, 32 and 34, and detectors 40, 42 and 44, and the ratio of the products is produced using the electronics schematically shown in FIG. 2. The counters 73, 75, 77 and 74, 76 and 78 convert the current pulses produced in the detectors into digital voltage pulses by means of amplifiers and voltage discriminators as is well known to those skilled in the art. The counters use internal filters to continuously determine the count rate on an instantaneous basis. The multiplying devices 80 and 82 compute the products of the counters continuously on an instantaneous basis. Multiplier 80 computes the product of the counts in counters 73, 75 and 77 and multiplier 82 computes the product of the counts in counters 74, 76 and 78. Furthermore, the dividing device 80 computes the ratio 86 of the products produced by multipliers 80 and 82 once every measured interval.

The type of gamma ray sources is also not an object of the invention, since different types are preferred for different applications. Capsule type sources containing the radioactive isotopes such as cobalt 60 and cesium 137, are the types of gamma ray sources most frequently used in gamma ray density probes.

The diameters of the borehole and the sub 10 should be substantially equivalent. This can be accomplished by use of stabilizers on the exterior of the sub which are then part of the relative diameter determination.

Various other alterations in the details of construction and the sequence of computations can be made without departing from the scope of the invention, which is indicated in the appended claims.

What is claimed:

1. A device for use in a borehole traversing an earth formation comprising: gamma ray emitting means said means emitting collimated gamma ray beams along a first set of at least three trajectories, said trajectories projecting in an azimuthally symmetric pattern about the longitudinal axis of said device, intersecting at a first point on said axis of said device, and intersecting a first circle located in a sample of said formation to be measured; first gamma ray detecting means oriented to receive emitted gamma rays scattered from at least three locations within said formation sample along a second set of at least three trajectories, said trajectories projecting in an azimuthally symmetric pattern about said axis of said device intersecting a second point on said axis of said device and intersecting said first circle; and means for determining a first product of the counting rates of gamma rays received by said first detecting means from each of said at least three trajectories as scattered from each of said at least three locations within said formation sample, wherein said first product is indicative of the average density of said formation sample.

2. The device of claim 1 wherein said first circle lies in a first plane which is perpendicular to the axis of said device and intersects said axis at a third point.

3. The device of claim 1 wherein said device is adaptable for use in a drill string.

4. The device of claim 1 wherein said gamma ray emitting means comprises gamma sources, each source collimated to emit gamma rays along one of each of said first set of at least three trajectories.

5. The device of claim 4 wherein said sources are positioned in an azimuthally symmetric pattern about said device and lie in a second plane which is perpendicular to the axis of said device.

6. The device of claim 1 wherein said first detecting means comprises at least three detectors, each said detector collimated to receive gamma rays along one of said second set of at least three trajectories.

7. The device of claim 1 wherein said device is operable irrespective of the location of said device within said borehole.

8. The device of claim 1 wherein the diameter of said device is substantially equivalent to but somewhat smaller than the diameter of said borehole.

9. The device of claim 1 comprising additionally: second detecting means oriented to receive emitted gamma rays scattered from said at least three locations within said formation sample along a third set of at least three trajectories, said trajectories intersecting at a fourth point on the axis of said device and intersecting a second circle about said axis, said second circle being intersected by said first set of at least three trajectories; means for determining a second product of the counting rates of gamma rays received by said second detecting means from each of said at least three trajectories as scattered from each of said at least three locations within said formation sample; and divider means for dividing said first product by said second product to provide a ratio which is indicative of an average compensated density of said formation sample.

10. The device of claim 1 wherein said first point is spaced apart from said second point.

11. The device of claim 9 wherein said first point and said second point are spaced apart from said fourth point.

12. The device of claim 10 wherein said first point is on one side of said third point and said second point is on the opposed side of said third point.

13. The device of claim 9 wherein said first point is on one side of said third point and said fourth point is on the opposed side of said third point.

14. A method of determining the average density of a formation sample surrounding a borehole comprising: lowering a device into said borehole to a location adjacent to said sample; emitting gamma rays into said formation from the device along a first set of at least three trajectories projecting in an azimuthally symmetric pattern about the axis of said device, said first set of at least three trajectories intersecting at a first point on the axis of said device and also intersecting a first circle located in said formation sample; counting said emitted gamma rays scattered from said formation sample back to said device along a second set of at least three trajectories projecting in an azimuthally symmetric pattern about the axis of said device, said second set of at least three trajectories intersecting at a second point on the axis of said device and also intersecting said first circle; and determining a first product of said at least three counts, wherein said first product is indicative of the average density of said formation sample.

15. The method of claim 14 comprising the additional steps of: counting said emitted gamma rays scattered from said formation sample back to said device along a third set of at least three trajectories projectng in an azimuthally symmetric pattern about the axis of said device, said third set of at least three trajectories intersecting at a third point spaced apart from said second point on said axis of said device, and also intersecting a second circle about said axis, said second circle also being intersected by said first set of at least three trajectories; determining a second product of said at least three counts; and determining the ratio between said first and said second product, wherein said ratio is indicative of an average compensated density of said formation sample.

* * * * *